(12) United States Patent
Poornachary et al.

(10) Patent No.: US 11,245,742 B2
(45) Date of Patent: Feb. 8, 2022

(54) APPARATUS, SYSTEM, AND METHOD FOR FLOW-LEVEL SWITCHOVER OF VIDEO STREAMS

(71) Applicant: Juniper Networks, Inc., Sunnyvale, CA (US)

(72) Inventors: Manikandan Musuvathi Poornachary, Bangalore (IN); Ayushi Jain, Jaipur (IN); Aayush Gupta, Delhi (IN)

(73) Assignee: Juniper Networks, Inc, Sunnyvale, CA (US)

( * ) Notice: Subject to any disclaimer, the term of this patent is extended or adjusted under 35 U.S.C. 154(b) by 38 days.

(21) Appl. No.: 16/517,032

(22) Filed: Jul. 19, 2019

(65) Prior Publication Data
US 2021/0021665 A1    Jan. 21, 2021

(51) Int. Cl.
*H04L 29/06* (2006.01)

(52) U.S. Cl.
CPC .............. *H04L 65/80* (2013.01); *H04L 65/60* (2013.01)

(58) Field of Classification Search
CPC ................................. H04L 65/80; H04L 65/60
USPC ....................................................... 709/224
See application file for complete search history.

(56) References Cited

U.S. PATENT DOCUMENTS

| | | | | |
|---|---|---|---|---|
| 8,155,022 B1* | 4/2012 | Ainsworth | ............ | H04L 45/245 370/252 |
| 8,837,479 B1* | 9/2014 | Kumar | .................... | H04L 45/28 370/390 |
| 9,292,826 B1* | 3/2016 | Chen | ..................... | H04L 65/607 |
| 9,654,527 B1* | 5/2017 | Narayanan | .......... | H04L 12/1831 |
| 9,806,895 B1* | 10/2017 | Kommula | .............. | H04L 49/201 |
| 2005/0283820 A1* | 12/2005 | Richards | .......... | H04N 21/41415 725/146 |
| 2011/0116443 A1* | 5/2011 | Yu | ......................... | H04L 12/413 370/328 |
| 2013/0107699 A1* | 5/2013 | Miclea | .................... | H04L 45/28 370/228 |
| 2015/0333999 A1* | 11/2015 | Mordani | ............. | H04L 41/0681 709/224 |
| 2016/0014175 A1* | 1/2016 | Somuah | .................. | H04L 65/60 709/202 |
| 2016/0234282 A1* | 8/2016 | Lederer | ............... | H04N 21/2402 |
| 2017/0264665 A1* | 9/2017 | Stevens | ................... | H04L 65/80 |
| 2017/0353382 A1* | 12/2017 | Gupta | ..................... | H04L 45/28 |

(Continued)

OTHER PUBLICATIONS

A Karan, RFC 7431: Multicast-Only Fast Reroute, Aug. 2015 (Year: 2015).*

*Primary Examiner* — Schquita D Goodwin
(74) *Attorney, Agent, or Firm* — FisherBroyles, LLP

(57) ABSTRACT

A disclosed method may include (1) measuring a quality level of a first instance of a video flow received via a first link within a network, (2) measuring a quality level of a second instance of the video flow received via a second link within the network, (3) determining that the quality level of the second instance of the video flow is better than the quality level of the first instance of the video flow, and then in response to determining that the quality level of the second instance of the video flow is better, (4) performing a flow-level switchover from the first instance of the video flow to the second instance of the video flow by (A) activating the second instance of the video flow and (B) deactivating the first instance of the video flow. Various other apparatuses, systems, and methods are also disclosed.

17 Claims, 7 Drawing Sheets

(56) References Cited

U.S. PATENT DOCUMENTS

2018/0212861 A1* 7/2018 Ou .................... H04L 45/16
2020/0351322 A1* 11/2020 Magzimof ............ H04L 65/607

* cited by examiner

APPARATUS, SYSTEM, AND METHOD FOR FLOW-LEVEL SWITCHOVER OF VIDEO STREAMS

BACKGROUND

In some networks, duplicate video flows may be forwarded to certain nodes via separate links to facilitate reliable delivery of the corresponding video content. These duplicate video flows may enable such networks to switchover from one link to another in the event of a technical failure and/or disturbance. By switching over from one link to another in this way, these networks may be able to provide redundancy that ensures delivery of the corresponding video content despite technical failures, disturbances, and/or unexpected events. This switchover technology is sometimes referred to as Multicast-only Fast Re-Routing (MoFRR).

Unfortunately, MoFRR may suffer from certain deficiencies and/or drawbacks. For example, traditional MoFRR may be limited to link-level switchovers. In other words, when traditional MoFRR is performed by switching from one link to another, the entire link may be shut down. As a result, delivery of all active video flows on the one link may be forced to the other link even if some of those flows were healthy. The instant disclosure, therefore, identifies and addresses a need for additional and improved apparatuses, systems, and methods for flow-level switchover of video streams.

SUMMARY

As will be described in greater detail below, the instant disclosure generally relates to apparatuses, systems, and methods for flow-level switchover of video streams. In one example, a method for accomplishing such a task may include (1) measuring a quality level of a first instance of a video flow received via a first link within a network, wherein the first instance of the video flow is currently active and forwarded toward a destination of the video flow, (2) measuring a quality level of a second instance of the video flow received via a second link within the network, wherein the second instance of the video flow is currently inactive and not forwarded toward the destination of the video flow, (3) determining that the quality level of the second instance of the video flow is better than the quality level of the first instance of the video flow, and then in response to determining that the quality level of the second instance of the video flow is better, (4) performing a flow-level switchover from the first instance of the video flow to the second instance of the video flow by (A) activating the second instance of the video flow and (B) deactivating the first instance of the video flow.

Similarly, a system that implements the above-identified method may include a physical processing device configured to execute various modules stored in memory. In one example, this system may include and/or execute (1) a measurement module that (A) measures a quality level of a first instance of a video flow received via a first link within a network, wherein the first instance of the video flow is currently active and forwarded toward a destination of the video flow, and (2) measures a quality level of a second instance of the video flow received via a second link within the network, wherein the second instance of the video flow is currently inactive and not forwarded toward the destination of the video flow, (2) a determination module that determines that the quality level of the second instance of the video flow is better than the quality level of the first instance of the video flow, and (3) a switchover module that performs a flow-level switchover from the first instance of the video flow to the second instance of the video flow by (A) activating the second instance of the video flow and (B) deactivating the first instance of the video flow.

Additionally or alternatively, an apparatus that implements the above-identified method may include a first interface communicatively coupled to a first link within a network and a second interface communicatively coupled to a second link within the network. In one example, the apparatus may also include a physical processing device that is communicatively coupled to the first and second interfaces. In this example, the physical processing device may (1) measure a quality level of a first instance of a video flow received via a first link within a network, wherein the first instance of the video flow is currently active and forwarded toward a destination of the video flow, (2) measure a quality level of a second instance of the video flow received via a second link within the network, wherein the second instance of the video flow is currently inactive and not forwarded toward the destination of the video flow, (3) determine that the quality level of the second instance of the video flow is better than the quality level of the first instance of the video flow, and then (4) perform a flow-level switchover from the first instance of the video flow to the second instance of the video flow by (A) activating the second instance of the video flow and (B) deactivating the first instance of the video flow.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
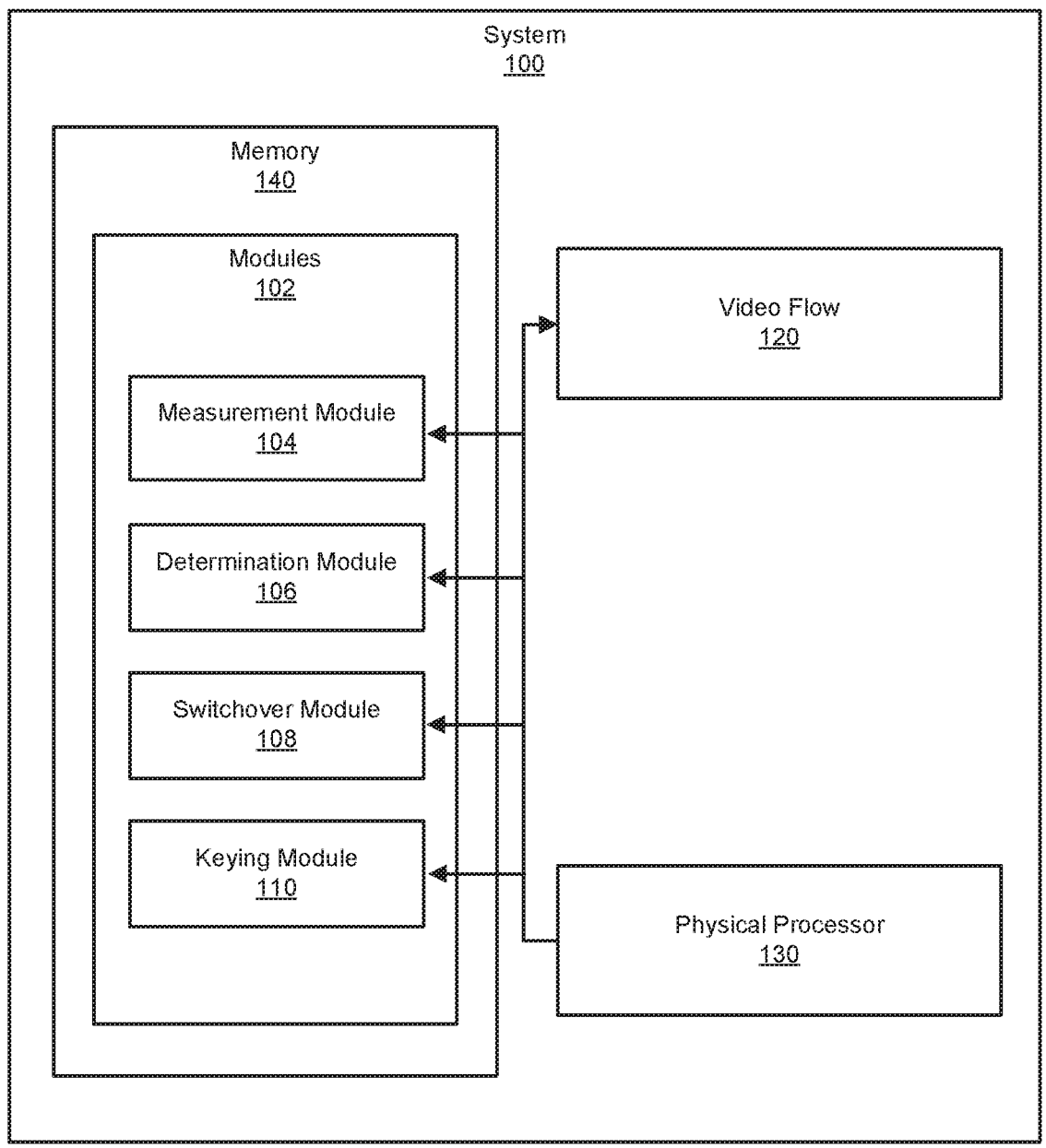
FIG. 1 is a block diagram of an exemplary system for flow-level switchover of video streams.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for flow-level switchover of video streams. As will be explained in greater detail below, by comparing the quality of paired video flows that arrive via separate ingress links on a regular basis, embodiments of the instant disclosure may be able to ensure delivery of the healthiest, highest-quality video flow to end-users. For example, embodiments of the instant disclosure may measure the quality of paired video flows every interval (e.g., 1-second intervals, 2-second intervals, etc.) based at least in part on certain quality indicators and/or metrics (such as the media rate variation, delay factor, media loss rate, and/or video jitter). In this example, the paired video flows may include and/or represent an active flow that arrives at a network node via one ingress link and an inactive flow that arrives at the network node via another ingress link. Both the active flow and the inactive flow may carry and/or facilitate the same video stream and/or content as one another. The network node may forward the active flow toward its destination but discard the inactive flow.

In some examples, the network node may regularly evaluate and/or reevaluate which of the paired video flows is exhibiting better quality at the moment. In the event that the active video flow is currently exhibiting better quality than the inactive video flow, the network node may continue forwarding that flow toward its destination to facilitate delivery of the corresponding video content. However, in the event that the inactive video flow is currently exhibiting better quality than the active flow, the network node may perform a flow-level switchover, as opposed to a link-level switchover. To achieve this flow-level switchover, the network node may inactivate the currently active video flow that arrived on the one ingress link and activate the currently inactive video flow that arrived on the other ingress link.

However, unlike a link-level switchover, this flow-level switchover may have no apparent effect on other video flows transmitted via the one ingress link. For example, the ingress link that carries the active video flow may also carry one or more additional video flows. In this example, those additional video flows may remain healthy on that ingress link even though the health of the active video flow begins to suffer. During the flow-level switchover, the network node may switch from the active video flow that arrived on the one ingress link to the inactive video flow that arrived on the other ingress link. However, the network node may continue forwarding the additional video flows that arrived on the same ingress link as the recently deactivated video flow. By doing so, the network node may be able to achieve a higher granularity of switchover at the flow level instead of the link level.

Figure 2:
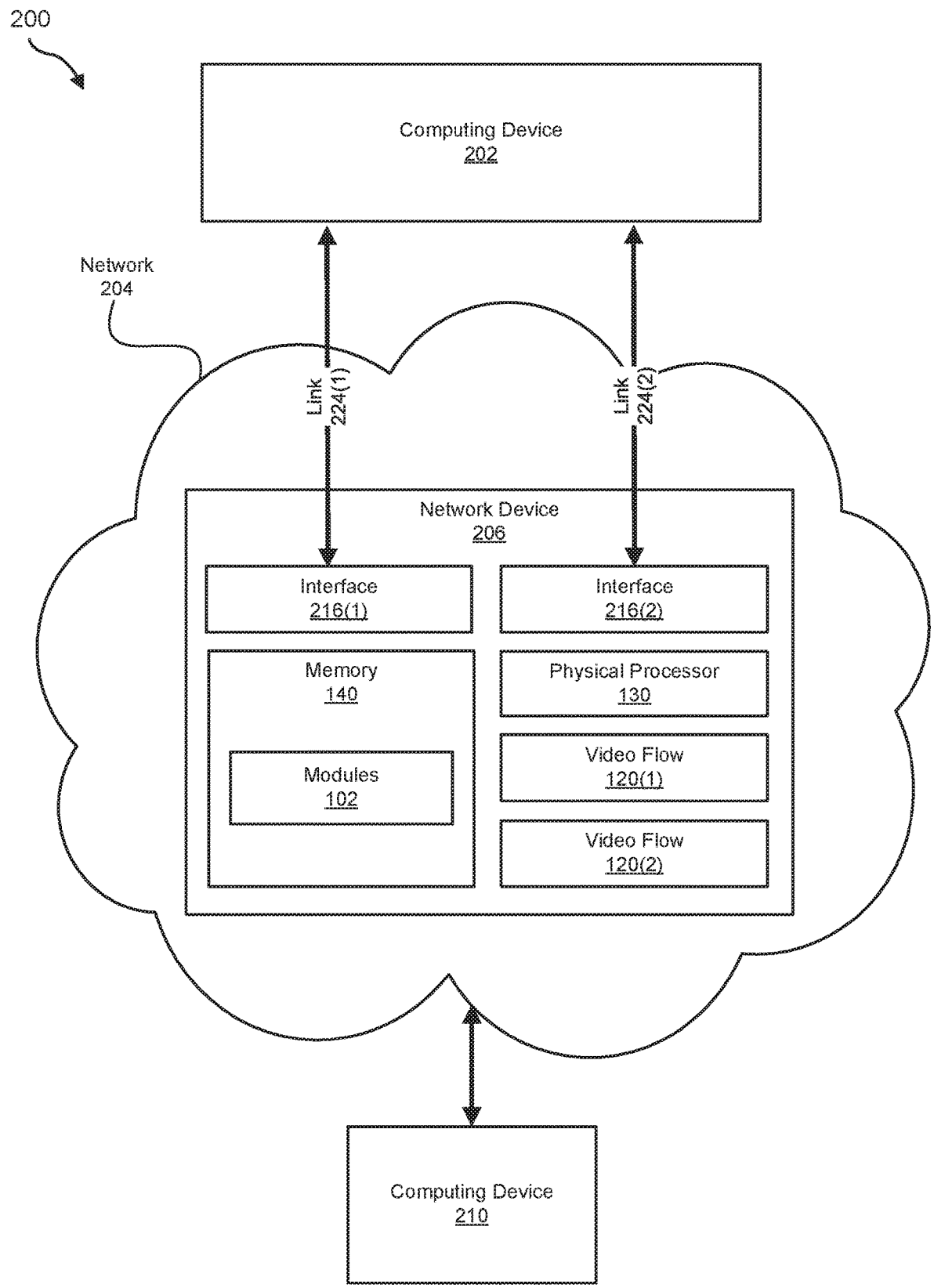
FIG. 2 is a block diagram of an exemplary system for flow-level switchover of video streams.
Figure 3:
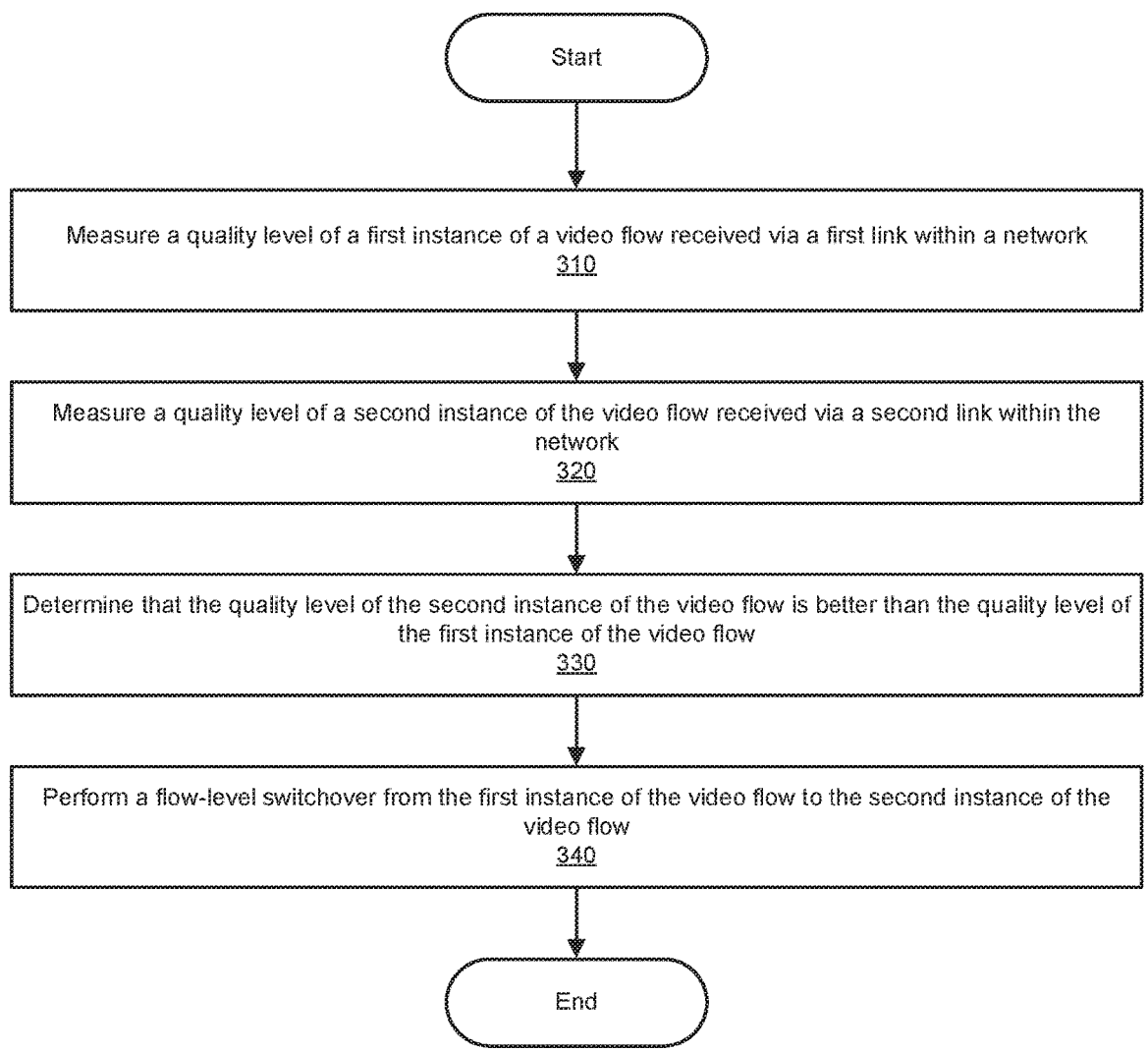
FIG. 3 is a flow diagram of an exemplary method for flow-level switchover of video streams.
Figure 4:
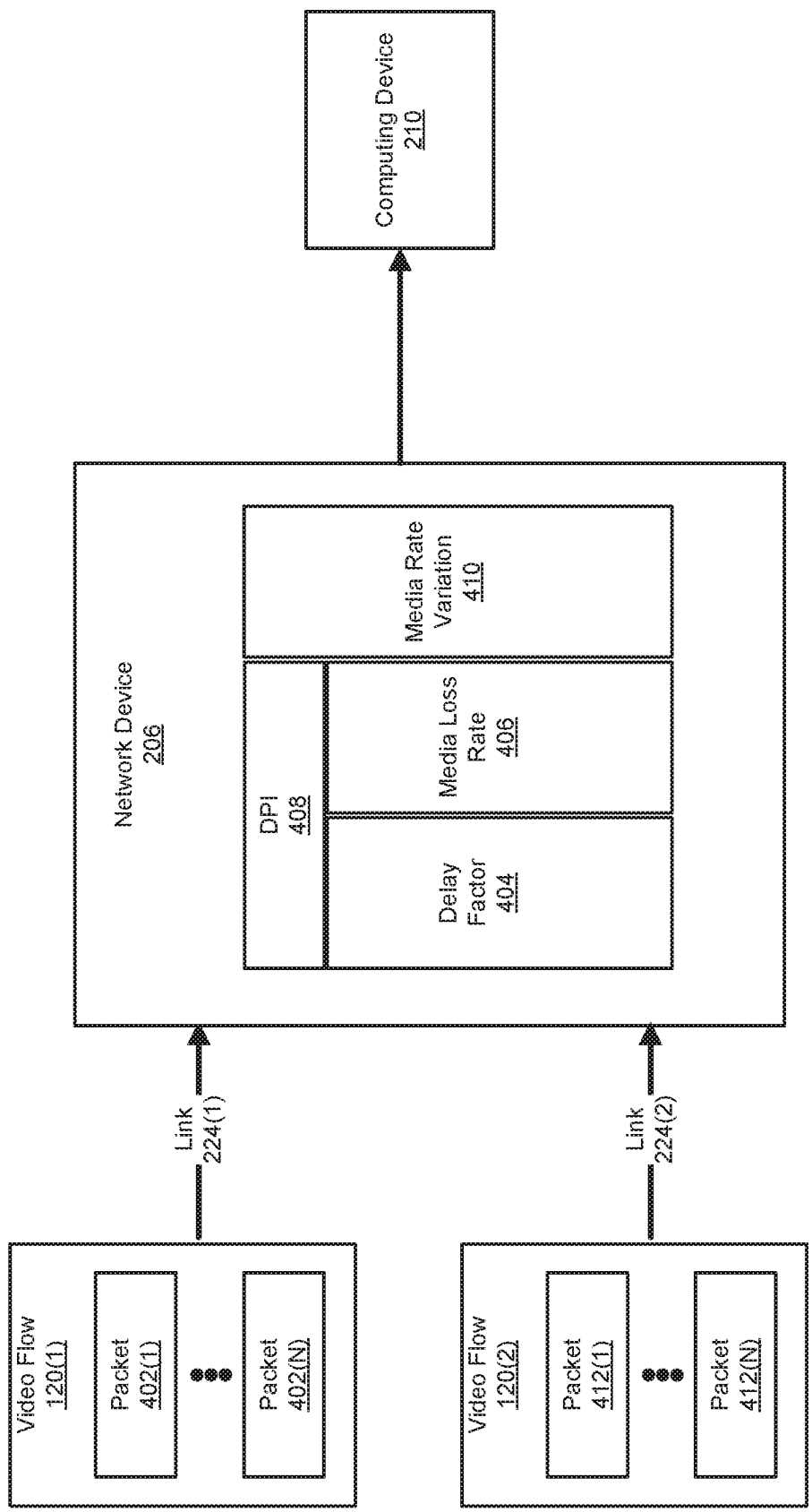
FIG. 4 is a block diagram of an exemplary system for flow-level switchover of video streams.

The following will provide, with reference to FIGS. 1, 2, and 4, detailed descriptions of exemplary apparatuses, systems, and corresponding implementations for flow-level switchover of video streams. Detailed descriptions of exemplary video flow metadata will be provided in connection with FIGS. 5 and 6. Detailed descriptions of an exemplary computer-implemented method for flow-level switchover of video streams will be provided in connection with FIG. 3. In addition, detailed descriptions of an exemplary computing system for carrying out these methods will be provided in connection with FIG. 7.

FIG. 1 shows an exemplary system 100 that facilitates flow-level switchover of video streams. As illustrated in FIG. 1, system 100 may include one or more modules 102 for performing one or more tasks. As will be explained in greater detail below, modules 102 may include a measurement module 104, a determination module 106, a switchover module 108, and/or a keying module 110. Although illustrated as separate elements, one or more of modules 102 in FIG. 1 may represent portions of a single module or application (such as an operating system, a processing application, and/or a network application) running on a processing device, a routing engine, a field-replaceable unit, a packet forwarding engine, and/or any other suitable component of a network device.

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent modules stored and configured to run on one or more computing devices, such as the devices illustrated in FIG. 2 (e.g., computing device 202, computing device 210, and/or network device 206). One or more of modules 102 in FIG. 1 may also represent all or portions of one or more special-purpose computers configured to perform one or more tasks.

As illustrated in FIG. 1, exemplary system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, exemplary system 100 may also include one or more physical processors, such as physical processor 130. Physical processor 130 generally represents any type or form of hardware-implemented processing device capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate flow-level switchover of video streams. Examples of physical processor 130 include, without limitation, CPUs, microprocessors, microcontrollers, Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, exemplary system 100 may further include and/or involve one or more video flows, such as a video flow 120. In some examples, video flow 120 may include and/or represent a video stream, video content, and/or video data that is transmitted and/or transferred from one device to another via a network. In one example, video flow 120 may include and/or represent a single instance of a video stream that traverses and/or travels through a network. Additionally or alternatively, video flow 120 may include and/or represent multiple instances of a video stream that traverses and/or travels through a network.

Exemplary system 100 in FIG. 1 may be implemented in a variety of ways. For example, all or a portion of exemplary system 100 may represent portions of exemplary system 200 in FIG. 2. As shown in FIG. 2, system 200 may include a network 204 that facilitates communication among a computing device 202 and/or a computing device 210. In one example, network 204 may include and/or incorporate a network device 206. Network device 206 may also include and/or incorporate memory 140 and physical processor 130. In this example, physical processor 130 may execute one or more of modules 102 stored in memory 140 for the purpose of flow-level switchover of video streams. In addition, network device 206 may include interfaces 216(1) and 216(2) that facilitates communication with computing device 202 via links 224(1) and 224(2).

For example, and as will be described in greater detail below, one or more of modules 102 may cause network device 206 to (1) measure a quality level of a video flow 120(1) received via link 224(1) within network 204, wherein video flow 120(1) is currently active and forwarded toward a destination of video flow 120(1), (2) measure a quality level of a video flow 120(2) received via link 224(2) within network 204, wherein video flow 120(2) is currently inactive and not forwarded toward the destination of video flow 120(2), (3) determine that the quality level of video flow 120(2) is better than the quality level of video flow 120(1), and then (4) perform a flow-level switchover from video flow 120(1) to video flow 120(2) by (A) activating video flow 120(2) and (B) deactivating the video flow 120(1).

Network device 206 generally represents any type or form of physical computing device capable of reading computer-executable instructions and/or handling network traffic. In one example, network device 206 may include and/or represent a router (such as a provider edge router, hub router, spoke router, autonomous system boundary router, and/or area border router) that receives, routes, forwards, and/or otherwise handles network traffic. Additional examples of network device 206 include, without limitation, switches, hubs, modems, bridges, repeaters, gateways, multiplexers, network adapters, network interfaces, laptops, tablets, desktops, servers, cellular phones, Personal Digital Assistants (PDAs), multimedia players, embedded systems, wearable devices, gaming consoles, variations or combinations of one or more of the same, and/or any other suitable network devices. An apparatus or system for flow-level switchover of video streams may include and/or represent all or a portion of network device 206. This apparatus or system may be capable of performing any of the functionalities described herein in connection with flow-level switchover of video streams.

Network 204 generally represents any medium or architecture capable of facilitating communication or data transfer. In one example, network 204 may facilitate communication between network device 206 and computing device 202 and/or computing device 210. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network. Although illustrated as being external to network 204 in FIG. 2, computing devices 202 and 210 may alternatively represent portions of network 204 and/or be included in network 204.

Computing devices 202 and 210 each generally represent any type or form of computing device capable of reading computer-executable instructions. In one example, computing device 202 may include and/or represent a media server involved and/or engaged in a communication session with computing device 210 via network 204. In another example, computing devices 202 and/or 210 may each include and/or represent a network device (such as a router and/or switch) that handles and/or forwards traffic within a network and/or across networks. Additional examples of computing devices 202 and 210 include, without limitation, endpoint devices, client devices, laptops, tablets, desktops, servers, cellular phones, Personal Digital Assistants (PDAs), multimedia players, embedded systems, client devices, wearable devices (e.g., smart watches, smart glasses, etc.), gaming consoles, variations or combinations of one or more of the same, and/or any other suitable computing device. Although illustrated as a single element or unit in FIG. 2, computing device 202 may represent multiple computing devices that collectively originate and/or source video flows 120(1) and 120(2) to network device 206.

Interfaces 216(1) and 216(2) each generally represent any type or form of physical and/or virtual interface that facilitates communicative coupling computing devices to one another via links. Examples of interfaces 216(1) and 216(2) include, without limitation, Network Interface Cards (NICs), packet forwarding engines, routing engines, Physical Interface Cards (PICS), Flexible PIC Concentrators (FPCs), Switch Interface Boards (SIBS), control boards, communication ports, fan trays, connector interface panels, line cards, egress interfaces, ingress interfaces, virtual interfaces partitioned on physical interfaces, portions of one or more of the same, combinations or variations of one or more of the same, and/or any other suitable interfaces.

Links 224(1) and 224(2) each generally represent any type or form of communication cabling, channeling, and/or conduit that facilitates forwarding video flows from one device to another. Examples of links 224(1) and 224(2) include, without limitation, fiber optic cables, coaxial cables, twisted pair cables, Ethernet cables, combinations or variations of one or more of the same, and/or any other suitable links.

FIG. 3 is a flow diagram of an exemplary computer-implemented method 300 for flow-level switchover of video streams. The steps shown in FIG. 3 may be performed by any suitable computer-executable code and/or computing system, including system 100 in FIG. 1, system 200 in FIG. 2, system 700 in FIG. 7, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310 one or more of the systems described herein may measure a quality level of a first instance of a video flow received via a first link within a network. For example, measurement module 104 may, as part of network device 206 in FIG. 2, measure a quality level of video flow 120(1) received from computing device 202 via link 224(1) within network 204. In this example, link 224(1) may communicatively couple computing device 202 and network device 206 to one another. One side of link 224(1) may connect and/or attach to interface 216(1) of network device 206.

In one example, video flow 120(1) may include and/or represent one instance of a video stream that is transmitted and/or transferred via network 204. Video flow 120(1) may be currently active and/or forwarded toward a destination of video flow 120(1). In this example, computing device 210 may represent the destination of video flow 120(1).

The systems described herein may perform step 310 in a variety of ways and/or contexts. In some examples, measurement module 104 may identify one or more quality indicators for video flow 120(1). In these examples, measurement module 104 may use such quality indicators to measure and/or gauge the quality of video flow 120(1). Examples of such quality indicators include, without limitation, a media rate variation that represents a relationship between an expected packet rate and an actual packet rate, a delay factor component, a media loss rate component, a video jitter component, combinations or variations of one or more of the same, and/or any other suitable quality indicators.

In some examples, the expected packet rate may include and/or represent the speed at which a video flow is expected to provide and/or deliver packets from computing device 202 to network device 206 via link 224(1). In one example, measurement module 104 may identify the expected packet rate based at least in part on certain characteristics and/or attributes of video flow 120(1). For example, measurement module 104 may identify the expected packet rate by inspecting and/or searching metadata of video flow 120(1). Additionally or alternatively, measurement module 104 may receive the expected packet rate from a computing device (such as computing device 202 and/or 210).

As an example, measurement module 104 may determine and/or calculate the expected packet rate based at least in part on certain characteristics and/or attributes of video flow 120(1). For example, measurement module 104 may determine and/or calculate the expected packet rate by applying the following formula:

$$\text{Expected Packet Rate} = \frac{\text{Expected Media Rate}}{\text{Media Packet Count} * \text{Media Packet Size}}.$$

In this example, the expected media rate may correspond to and/or represent the rate (in, e.g., bits per second) at which video flow 120(1) is expected to traverse and/or pass through network device 206 during a Media Delivery Index (MDI) interval. In other words, the expected media rate may account for the amount of data expected to pass through network device 206 during the MDI interval. The media packet count may correspond to and/or represent the number of media packets carried via the network layer and/or Layer 3 during the MDI interval. In addition, the media packet size may correspond to and/or represent the size of each of those media packets (in, e.g., bits).

In some embodiments, the expected media rate may correspond to, coincide with, and/or track with the type of media involved in video flow 120(1) and/or the desired resolution of video flow 120(1). As a specific example, video flow 120(1) may include and/or represent a 1080p high-definition video. In this example, to achieve and/or maintain the desired quality for such a video, video flow 120(1) may have an expected media rate of 5000 kilobits per second. As another example, video flow 120(1) may include and/or represent a 720p high-definition video. In this example, to achieve and/or maintain the desired quality for such a video, video flow 120(1) may have an expected media rate of 2500 kilobits per second.

In some examples, measurement module 104 may measure and/or determine an actual packet rate of video flow 120(1) at network device 206. In this example, the actual packet rate may include and/or represent the speed at which video flow 120(1) actually provides and/or delivers packets from computing device 202 to network device 206 via link 224(1). Additionally or alternatively, measurement module 104 may receive statistics of video flow 120(1) from computing device 202, computing device 210, and/or a separate network device (not necessarily illustrated in FIG. 2) within network 204. From these statistics, measurement module 104 may determine the actual packet rate of video flow 120(1).

In some examples, measurement module 104 may calculate and/or determine a media rate variation of video flow 120(1) based at least in part on the expected packet rate and the actual packet rate. In one example, measurement module 104 may calculate the media rate variation by subtracting the expected packet rate from the actual packet rate. In this example, the media rate variation may be expressed as a percentage of the expected packet rate for the MDI interval. For example, measurement module 104 may calculate the media rate variation by applying the following formula:

$$\text{Media Rate Variation} = \frac{\text{Expected Packet Rate} - \text{Actual Packet Rate}}{\text{Expected Packet Rate}} * 100.$$

In this example, the media rate variation may serve as an efficient indicator and/or metric of the quality and/or health of video flow 120(1).

In some examples, the media rate variation may not necessitate Deep Packet Inspection (DPI). Accordingly, measurement module 104 may be able to calculate the media rate variation as an inline function without necessarily introducing much, if any, latency into video flow 120(1). In one example, the systems and methods disclosed herein may rely on the media rate variation as a preliminary inquiry into the quality of video flow 120(1) without invoking DPI. On the one hand, if the media rate variation indicates that the quality of video flow 120(1) appears to be worse than the quality of video flow 120(2), these systems and methods may opt to switchover from video flow 120(1) to video flow 120(2). On the other hand, if the media rate variation indicates that the quality of video flow 120(1) appears to be better than the quality of video flow 120(2), these systems and methods may opt to maintain video flow 120(1) as active and video flow 120(2) as inactive.

In some examples, measurement module 104 may generate an alarm value for video flow 120(1) based at least in part on the quality level of video flow (1). In one example, this alarm value may represent and/or correspond to a level of alarm for video flow (1). For example, one alarm definition may map a value of "8" to a "No Alarm" level, a value of "4" to an "Info" alarm level, a value of "2" to a "Warning" alarm level, and/or a value of "1" to a "Critical" alarm value. Measurement module 104 may store and/or record the alarm value for video flow 120(1) as metadata on network device 206 for reference and/or comparison purposes.

As illustrated in FIG. 3, at step 320 one or more of the systems described herein may measure a quality level of a second instance of a video flow received via a second link within a network. For example, measurement module 104 may, as part of network device 206 in FIG. 2, measure a quality level of video flow 120(2) received from computing device 202 via link 224(2) within network 204. In this example, link 224(2) may communicatively couple computing device 202 and network device 206 to one another. One side of link 224(2) may connect and/or attach to interface 216(2) of network device 206.

In one example, video flow 120(2) may include and/or represent another instance of the same video stream as video flow 120(1). Video flow 120(2) may be currently inactive and/or not forwarded toward its destination. In this example, video flows 120(1) and video flow 120(2) may both be destined for computing device 210. However, because video flow 120(1) is active and video flow 120(2) is inactive, network device 206 may forward video flow 120(1) to computing device 210 but refrain from forwarding video flow 120(2) to computing device 210. Accordingly, although video flows 120(1) and 120(2) are both destined for computing device 210, computing device 210 may receive only one of video flows 120(1) and 120(2) at any moment in time.

In some examples, the term "active," as used herein, may refer to a video flow that is forwarded toward its destination by network device 206. In such examples, the term "inactive," as used herein, may refer to a video flow that is discarded by network device 206 instead of being forwarded its destination.

The systems described herein may perform step 320 in a variety of ways and/or contexts. In some examples, measurement module 104 may identify one or more quality indicators for video flow 120(2). In these examples, measurement module 104 may use such quality indicators to measure and/or gauge the quality of video flow 120(2). Additionally or alternatively, measurement module 104 may measure the quality of video flow 120(2) in any of the same ways described above in connection with step 310.

In some examples, one or more of the systems described herein may pair video flows 120(1) and 120(2) together. For example, a keying module 110 may, as part of computing device 202 in FIG. 2, may create a video key that applies to both of video flows 120(1) and 120(2). In this example, keying module 110 may append the video key to video flows 120(1) and 120(2). Accordingly, the video key may serve as metadata for both of video flows 120(1) and 120(2). This video key may be the same for both of video flows 120(1) and 120(2).

Additionally or alternatively, keying module 110 may create a first flow key that uniquely identifies video flow 120(1) and/or a second flow key that uniquely identifies video flow 120(2). In this example, keying module 110 may append the first flow key to video flow 120(1) and/or the second flow key to video flow 120(2). Accordingly, the first flow key may serve as metadata for video flow 120(1), and the second flow key may serve as metadata for video flow 120(2). The first flow key and the second flow key may differ from one another.

Figure 5:
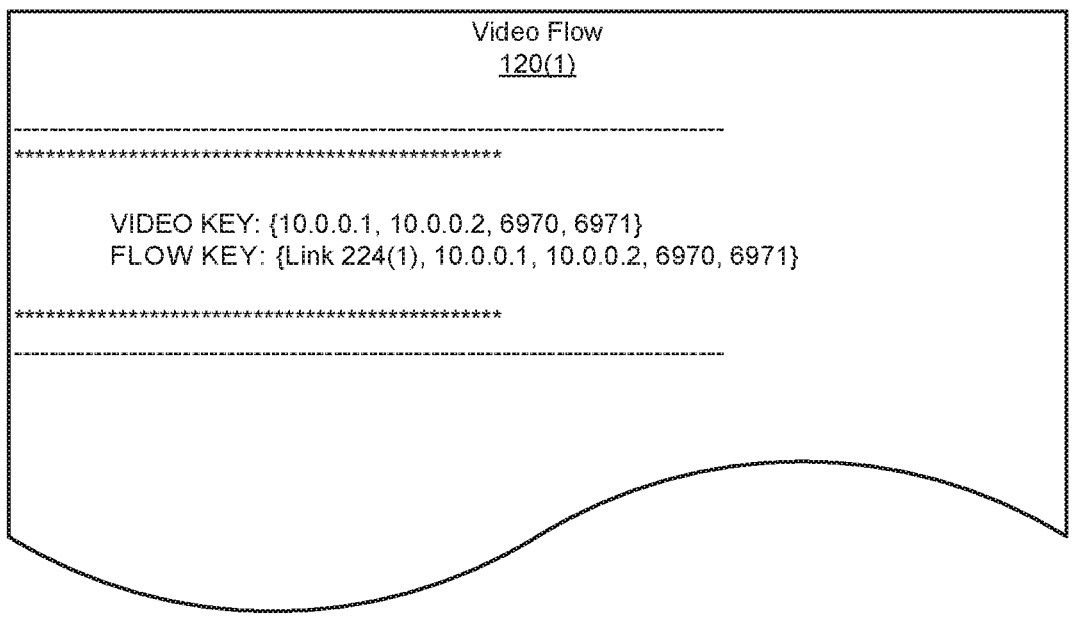
FIG. 5 is an illustration of exemplary video flow metadata that includes video and flow keys appended to paired video flows.
Figure 5:
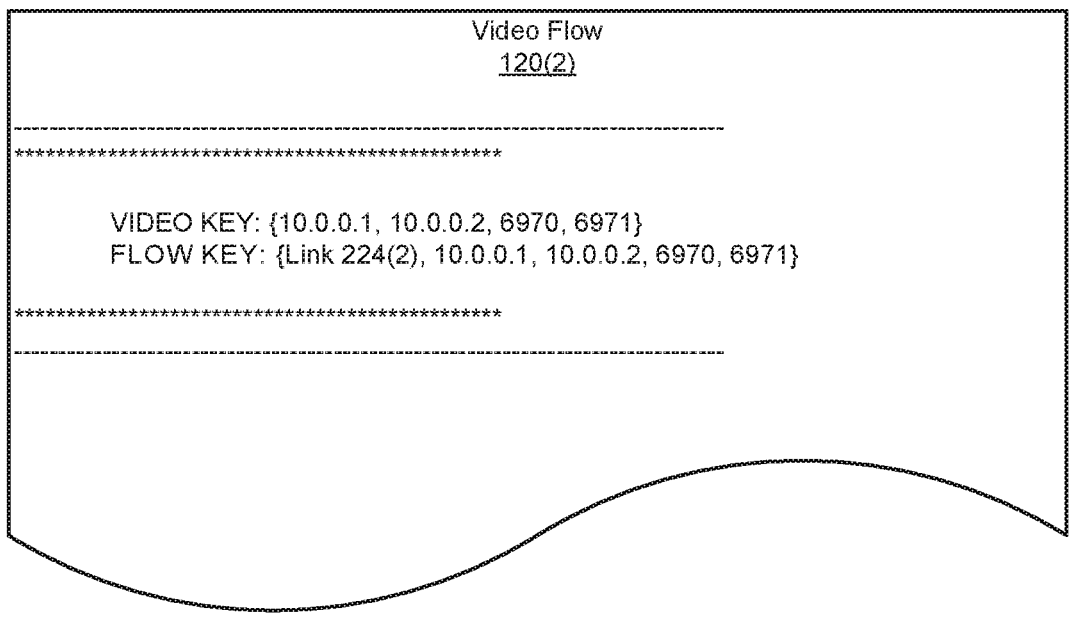

As a specific example illustrated in FIG. 5, video flow 120(1) may have a video key that includes a 4-tuple that identifies the source address, the destination address, the source port, and the destination port of video flow 120(1) (in this example, "{10.0.0.1, 10.0.0.2, 6970, 6971}"). In this example, video flow 120(1) may have a flow key that includes a 5-tuple that identifies the input link, the source address, the destination address, the source port, and the destination port of video flow 120(1) (in this example, "{Link 224(1), 10.0.0.1, 10.0.0.2, 6970, 6971}"). As further illustrated in this example of FIG. 5, video flow 120(2) may have a video key that includes a 4-tuple that identifies the source address, the destination address, the source port, and the destination port of video flow 120(2) (in this example, "{10.0.0.1, 10.0.0.2, 6970, 6971}"). In this example, video flow 120(2) may have a flow key that includes a 5-tuple that identifies the input link, the source address, the destination address, the source port, and the destination port of video flow 120(2) (in this example, "{Link 224(2), 10.0.0.1, 10.0.0.2, 6970, 6971}").

In some examples, measurement module 104 may generate an alarm value for video flow 120(2) based at least in part on the quality level of video flow (2). In one example, this alarm value may represent and/or correspond to a level of alarm for video flow (2). In this example, measurement module 104 may store and/or record the alarm value for video flow 120(2) as metadata on network device 206 for reference and/or comparison purposes.

Figure 6:
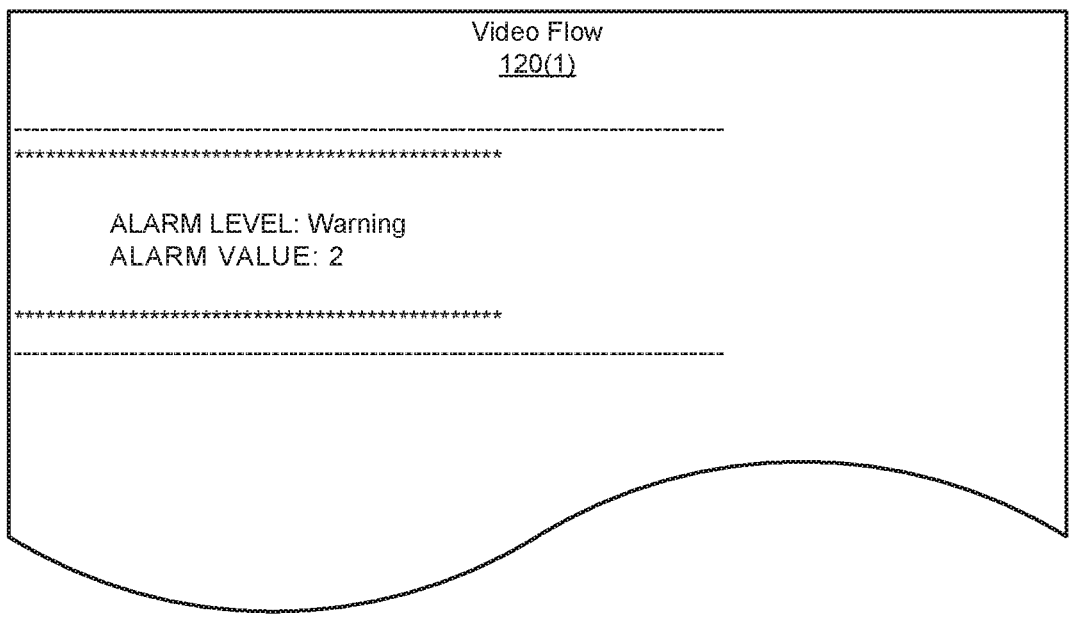
FIG. 6 is an illustration of exemplary video flow metadata that includes alarm levels and values corresponding to paired video flows.
Figure 6:
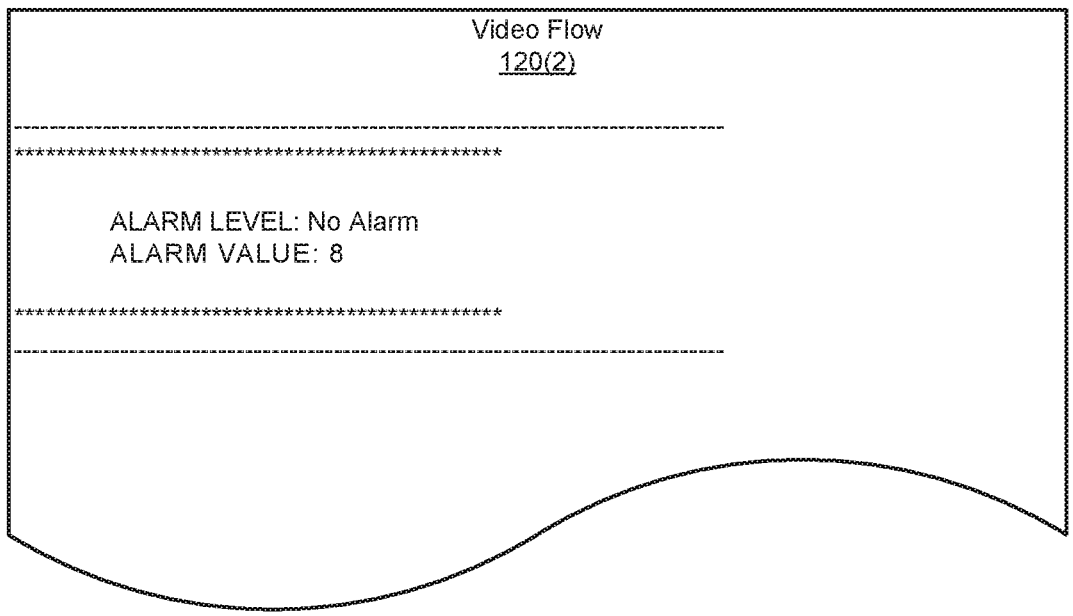

As a specific example illustrated in FIG. 6, video flow 120(1) may have an alarm value of "2" corresponding to a "Warning" alarm level. As further illustrated in this example of FIG. 6, video flow 120(2) may have an alarm value of "8" corresponding to an "No Alarm" level.

As illustrated in FIG. 3, at step 330 one or more of the systems described herein may determine that the quality level of the second instance of the video flow is better than the quality level of the first instance of the video flow. For example, determination module 106 may determine that the quality level of the video flow 120(2) is now better and/or higher than the quality level of video flow 120(1). In other words, determination module 106 may determine that video flow 120(2) is now healthier and/or of higher quality than video flow 120(1).

The systems described herein may perform step 330 in a variety of ways and/or contexts. In some examples, determination module 106 may compare the quality levels of video flows 120(1) and 120(2) with one another. For example, determination module 106 may compare one or more quality indicators for video flows 120(1) and 120(2) with one another. Determination module 106 may then determine that the quality level of video flow 120(2) is now better than the quality level of video flow 120(1) based at least in part on the comparison.

Referring to the specific example illustrated in FIG. 6, determination module 106 may compare the "2" alarm value and/or the "Warning" alarm level of video flow 120(1) against the "8" alarm value and/or the "No Alarm" level of video flow 120(2). In this example, determination module 106 may determine that video flow 120(2) is now exhibiting better quality than video flow 120(1) because the "8" alarm value of video flow 120(2) is less critical than the "2" alarm value of video flow (1).

In some examples, the quality levels of video flows 120(1) and 120(2) may be remeasured and/or reevaluated on a periodic basis (e.g., every second, every 2 seconds, every 3 seconds, etc.). For example, determination module 106 may reevaluate and/or reconsider which of video flows 120(1) and 120(2) has better quality every 2 seconds during a video streaming session. In this example, measurement module 104 may remeasure the quality levels of video flows 120(1) and 120(2) every 2 seconds. During one of these 2-second intervals, determination module 106 may determine that the quality of video flow 120(2) is better than the quality of video flow 120(1). Later, during another one of these 2-second intervals, determination module 106 may determine that the quality of video flow 120(1) is better than the quality of video flow 120(2).

Additionally or alternatively, measurement module 104 may remeasure the quality levels of video flows 120(1) and 120(2) over a series of 2-second intervals. In one example, after one series of 2-second intervals, determination module 106 may determine that the quality of video flow 120(2) is better than the quality of video flow 120(1). Later, after another series of 2-second intervals, determination module 106 may determine that the quality of video flow 120(1) is better than the quality of video flow 120(2).

In some examples, determination module 106 and/or switchover module 108 may determine that the quality levels of video flows 120(1) and 120(2) are currently the same and/or equal to one another. In such examples, determination module 106 and/or switchover module 108 may determine that no switchover is necessary at that moment due at least in part to the equal quality levels of video flows 120(1) and 120(2). This determination may facilitate the conservation of resources and/or simplicity of the desired functionality.

As illustrated in FIG. 3, at step 340 one or more of the systems described herein may perform a flow-level switchover from the first instance of the video flow to the second instance of the video flow in response to determining that the quality level of the second instance of the video flow is better. For example, switchover module 108 may, as part of network device 206 in FIG. 2, perform a flow-level switchover from the video flow 120(1) to video flow 120(2) in response to the determination that the quality level of video flow 120(2) is better than the quality level of video flow 120(1). In this example, switchover module 108 may achieve this flow-level switchover by activating video flow 120(2) and deactivating video flow 120(1).

The systems described herein may perform step 340 in a variety of ways and/or contexts. In some examples, switchover module 108 may activate video flow 120(2) by beginning to forward video flow 120(2) toward its destination (e.g., computing device 210). In these examples, switchover module 108 may deactivate video flow 120(1) by refraining from forwarding video flow 120(1) toward its destination (e.g., computing device 210).

In some examples, switchover module 108 may modify and/or change the active video flow and/or the inactive video flow from one interval and/or series of intervals to another as necessitated by their quality levels. Additionally or alternatively, switchover module 108 may maintain the active video flow and/or the inactive video flow from one interval and/or series of intervals to another as necessitated by their quality levels.

In some examples, because the switchover is flow-level instead of link-level, switchover module 108 may maintain one or more additional flows received via link 224(1) as active despite deactivating video flow 120(1) received via link 224(1). Accordingly, when the flow-level switchover is performed, switchover module 108 may refrain from shutting down link 224(1) as a whole. In other words, when the flow-level switchover is performed, switchover module 108 may allow at least some of the video flows received via link 224(1) to remain active even though video flow 120(1) has been deactivated. In one example, those video flows that are allowed to remain active on link 224(1) may be healthier and/or of higher quality than their counterparts on link 224(2) and/or another link (not necessarily illustrated in FIG. 2).

Additionally or alternatively, switchover module 108 may deactivate at least one additional video flow received via link 224(2) despite activating video flow 120(2) received via link 224(2). Accordingly, each video flow received via links 224(1) and 224(2) may be independent of one another for the purpose of activation and/or deactivation. In other words, any of video flows received via links 224(1) and 224(2) may be activated and/or deactivated independently of the other flows received via those links.

FIG. 4 illustrates an exemplary system for flow-level switchover of video streams. As illustrated in FIG. 4, this system may include and/or represent network device 206 and computing device 210. In one example, network device 206 may receive video flow 120(1) via link 224(1) and video flow 120(2) via link 224(2). In this example, video flow 120(1) may include and/or represent packets 402(1)-(N), and video flow 120(2) may include and/or represent packets 412(1)-(N).

In one example, network device 206 may measure the quality level of video flow 120(1) and/or the quality level of video flow 120(2) based at least in part on certain quality indicators, such as a delay factor 404, a media loss rate 406, and/or a media rate variation 410. In this example, network device 206 may be able to measure the quality levels of video flows 120(1) and 120(2) without invoking a DPI 408. Video flow 120(1) may be currently active and forwarded toward computing device 210, and video flow 120(2) may be currently inactive and not forwarded toward computing device 210. Network device 206 may determine that the quality level of video flow 120(2) is better than the quality level of video flow 120(1) and then, in response to that determination, perform a flow-level switchover from video flow 120(1) to video flow 120(2) by activating video flow 120(2) and deactivating video flow 120(1).

As described above in connection with FIGS. 1-6, the apparatuses, systems, and methods disclosed herein may be able to facilitate flow-level switchover of video streams. This new flow-level switchover technology may sometimes be referred to as Video-only Fast Re-Routing (VoFRR). In some examples, VoFRR may provide consistently high-quality video streams over a network. To do so, VoFRR may receive primary and secondary video streams over two links. VoFRR may monitor the quality of those streams and select the one with the best quality to forward and silently discard the other one with inferior quality.

Figure 7:
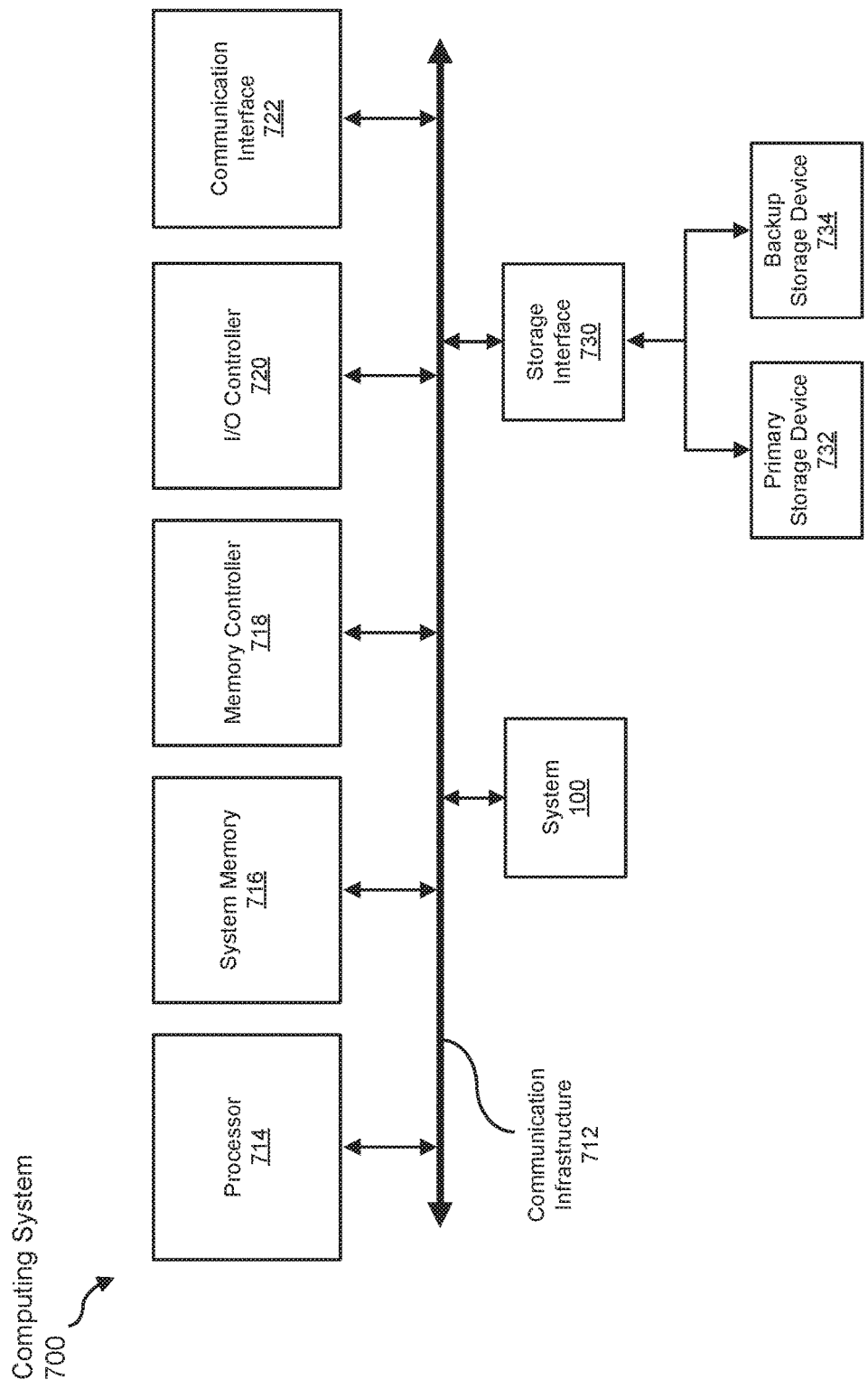
FIG. 7 is a block diagram of an exemplary computing system capable of implementing and/or being used in connection with one or more of the embodiments described and/or illustrated herein.

FIG. 7 is a block diagram of an exemplary computing system 700 capable of implementing and/or being used in connection with one or more of the embodiments described and/or illustrated herein. In some embodiments, all or a portion of computing system 700 may perform and/or be a means for performing, either alone or in combination with other elements, one or more of the steps described in connection with FIG. 3. All or a portion of computing system 700 may also perform and/or be a means for performing and/or implementing any other steps, methods, or processes described and/or illustrated herein.

Computing system 700 broadly represents any type or form of electrical load, including a single or multi-processor computing device or system capable of executing computer-readable instructions. Examples of computing system 700 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 700 may be programmed, configured, and/or otherwise designed to comply with one or more networking protocols. According to certain embodiments, computing system 700 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 700 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 700 may include various network and/or computing components. For example, computing system 700 may include at least one processor 714 and a system memory 716. Processor 714 generally represents any type or form of processing unit capable of processing data or interpreting and executing instructions. For example, processor 714 may represent an application-specific integrated circuit (ASIC), a system on a chip (e.g., a network processor), a hardware accelerator, a general purpose processor, and/or any other suitable processing element.

Processor 714 may process data according to one or more of the networking protocols discussed above. For example, processor 714 may execute or implement a portion of a protocol stack, may process packets, may perform memory operations (e.g., queuing packets for later processing), may execute end-user applications, and/or may perform any other processing tasks.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 700 may include both a volatile memory unit (such as, for example, system memory 716) and a non-volatile storage device (such as, for example, primary storage device 732, as described in detail below). System memory 716 may be implemented as shared memory and/or distributed memory in a network device. Furthermore, system memory 716 may store packets and/or other information used in networking operations.

In certain embodiments, exemplary computing system 700 may also include one or more components or elements in addition to processor 714 and system memory 716. For example, as illustrated in FIG. 7, computing system 700 may include a memory controller 718, an Input/Output (I/O) controller 720, and a communication interface 722, each of which may be interconnected via communication infrastructure 712. Communication infrastructure 712 generally represents any type or form of infrastructure capable of facilitating communication between one or more components of a computing device. Examples of communication infrastructure 712 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 718 generally represents any type or form of device capable of handling memory or data or controlling communication between one or more components of computing system 700. For example, in certain embodiments memory controller 718 may control communication between processor 714, system memory 716, and I/O controller 720 via communication infrastructure 712. In some embodiments, memory controller 718 may include a Direct Memory Access (DMA) unit that may transfer data (e.g., packets) to or from a link adapter.

I/O controller 720 generally represents any type or form of device or module capable of coordinating and/or controlling the input and output functions of a computing device. For example, in certain embodiments I/O controller 720 may control or facilitate transfer of data between one or more elements of computing system 700, such as processor 714, system memory 716, communication interface 722, and storage interface 730.

Communication interface 722 broadly represents any type or form of communication device or adapter capable of facilitating communication between exemplary computing system 700 and one or more additional devices. For example, in certain embodiments communication interface 722 may facilitate communication between computing system 700 and a private or public network including additional computing systems. Examples of communication interface 722 include, without limitation, a link adapter, a wired network interface (such as a network interface card), a wireless network interface (such as a wireless network interface card), and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 722 may also represent a host adapter configured to facilitate communication between computing system 700 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also enable computing system 700 to engage in distributed or remote computing. For example, communication interface 722 may receive instructions from a remote device or send instructions to a remote device for execution.

As illustrated in FIG. 7, exemplary computing system 700 may also include a primary storage device 732 and/or a backup storage device 734 coupled to communication infrastructure 712 via a storage interface 730. Storage devices 732 and 734 generally represent any type or form of storage device or medium capable of storing data and/or other computer-readable instructions. For example, storage devices 732 and 734 may represent a magnetic disk drive (e.g., a so-called hard drive), a solid state drive, a floppy disk drive, a magnetic tape drive, an optical disk drive, a flash drive, or the like. Storage interface 730 generally represents any type or form of interface or device for transferring data between storage devices 732 and 734 and other components of computing system 700.

In certain embodiments, storage devices 732 and 734 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 734 may also include other similar structures or devices for allowing computer software, data, or other computer-readable instructions to be loaded into computing system 700. For example, storage devices 732 and 734 may be configured to read and write software, data, or other computer-readable information. Storage devices 732 and 734 may be a part of computing system 700 or may be separate devices accessed through other interface systems.

Many other devices or subsystems may be connected to computing system 700. Conversely, all of the components and devices illustrated in FIG. 7 need not be present to practice the embodiments described and/or illustrated herein. The devices and subsystems referenced above may also be interconnected in different ways from those shown in FIG. 7. Computing system 700 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
    measuring a quality level of a first instance of a video flow received via a first link within a network by:
        identifying at least one quality indicator for the first instance of the video flow, the quality indicator for the first instance of the video flow comprising a media rate variation of the first instance of the video flow that represents a relationship between an expected packet rate of the first instance and an actual packet rate of the first instance; and
        calculating the expected packet rate of the first instance by:
            multiplying a number of packets in the first instance carried via a network layer during a Media Delivery Index (MDI) interval by a size of the packets in the first instance; and
            dividing a rate at which the video flow is expected to traverse a network device during the MDI interval by a product of the multiplication of the number of packets in the first instance and the size of the packets in the first instance, wherein the first instance of the video flow is currently active and forwarded toward a destination of the video flow;
    measuring a quality level of a second instance of the video flow received via a second link within the network by:

identifying at least one quality indicator for the second instance of the video flow, the quality indicator for the second instance of the video flow comprising a media rate variation of the second instance of the video flow that represents a relationship between an expected packet rate of the second instance and an actual packet rate of the second instance; and calculating the expected packet rate of the second instance by:

multiplying a number of packets in the second instance carried via the network layer during the MDI interval by a size of the packets in the second instance; and dividing the rate at which the video flow is expected to traverse the network device during the MDI interval by a product of the multiplication of the number of packets in the second instance and the size of the packets in the second instance, wherein the second instance of the video flow is currently inactive and not forwarded toward the destination of the video flow;

determining that the quality level of the second instance of the video flow is better than the quality level of the first instance of the video flow by:

comparing the quality indicator for the first instance of the video flow with the quality indicator for the second instance of the video flow; and determining, based at least in part on the comparison, that the quality level of the second instance of the video flow is better than the quality level of the first instance of the video flow; and in response to determining that the quality level of the second instance of the video flow is better, performing a flow-level switchover from the first instance of the video flow on the first link to the second instance of the video flow on the second link by:

activating the second instance of the video flow on the second link;

deactivating the first instance of the video flow on the first link;

maintaining a first instance of at least one additional flow received via the first link as active despite deactivating the first instance of the video flow received via the first link; and maintaining a second instance of the additional flow received via the second link as inactive despite activating the second instance of the video flow received via the second link.

2. The method of claim 1, further comprising pairing the first instance of the video flow received via the first link with the second instance of the video flow received via the second link by:

creating a video key that applies to the first and second instances of the video flow; and appending the video key to the first and second instances of the video flow.

3. The method of claim 1, further comprising:

appending, to the first instance of the video flow, a first flow key that uniquely identifies the first instance of the video flow; and appending, to the second instance of the video flow, a second flow key that uniquely identifies the second instance of the video flow.

4. The method of claim 1, wherein the quality indicator for the first and second instances of the video flow further comprises at least one of:

a delay factor component;

a media loss rate component; and a video jitter component.

5. The method of claim 1, wherein:

measuring the quality level of the first instance of the video flow comprises generating an alarm value for the first instance of the video flow;

measuring the quality level of the second instance of the video flow comprises generating an alarm value for the second instance of the video flow; and determining that the quality level of the second instance of the video flow is better comprises determining that the alarm value for the second instance of the video flow is less critical than the alarm value for the first instance of the video flow.

6. The method of claim 1, further comprising reevaluating whether the quality level of the first instance is better than the quality level of the second instance on a periodic basis.

7. The method of claim 6, wherein reevaluating whether the quality level of the first instance is better than the quality level of the second instance comprises:

remeasuring the quality level of the first instance of the video flow;

remeasuring the quality level of the second instance of the video flow;

determining that the quality level of the first instance of the video flow is better than the quality level of the second instance of the video flow; and in response to determining that the quality level of the first instance of the video flow is better, performing another flow-level switchover by:

activating the first instance of the video flow; and deactivating the second instance of the video flow.

8. The method of claim 6, wherein reevaluating whether the quality level of the first instance is better than the quality level of the second instance comprises:

remeasuring the quality level of the first instance of the video flow over a series of intervals;

remeasuring the quality level of the second instance of the video flow over the series of intervals;

determining that the quality level of the first instance of the video flow is better than the quality level of the second instance of the video flow over the series of intervals; and in response to determining that the quality level of the first instance of the video flow is better, performing another flow-level switchover by:

activating the first instance of the video flow; and deactivating the second instance of the video flow.

9. The method of claim 1, wherein performing the flow-level switchover comprises:

forwarding the second instance of the video flow toward the destination of the video flow; and refraining from forwarding the first instance of the video flow toward the destination of the video flow.

10. The method of claim 1, wherein performing the flow-level switchover comprises deactivating at least one additional flow received via the second link despite activating the second instance of the video flow received via the second link.

11. A system comprising:

a measurement module, stored in memory, that:

measures a quality level of a first instance of a video flow received via a first link within a network by:

identifying at least one quality indicator for the first instance of the video flow, the quality indicator for the first instance of the video flow comprising a media rate variation of the first instance of the video flow that represents a relationship between an expected packet rate of the first instance and an actual packet rate of the first instance; and calculating the expected packet rate of the first instance by:

multiplying a number of packets in the first instance carried via a network layer during a Media Delivery Index (MDI) interval by a size of the packets in the first instance; and dividing a rate at which the video flow is expected to traverse a network device during the MDI interval by a product of the multiplication of the number of packets in the first instance and the size of the packets in the first instance, wherein the first instance of the video flow is currently active and forwarded toward a destination of the video flow;

measures a quality level of a second instance of the video flow received via a second link within the network by:

identifying at least one quality indicator for the second instance of the video flow, the quality indicator for the second instance of the video flow comprising a media rate variation of the second instance of the video flow that represents a relationship between an expected packet rate of the second instance and an actual packet rate of the second instance; and calculating the expected packet rate of the second instance by:

multiplying a number of packets in the second instance carried via the network layer during the MDI interval by a size of the packets in the second instance; and dividing the rate at which the video flow is expected to traverse the network device during the MDI interval by a product of the multiplication of the number of packets in the second instance and the size of the packets in the second instance, wherein the second instance of the video flow is currently inactive and not forwarded toward the destination of the video flow;

a determination module, stored in memory, that determines that the quality level of the second instance of the video flow is better than the quality level of the first instance of the video flow by:

comparing the quality indicator for the first instance of the video flow with the quality indicator for the second instance of the video flow; and determining, based at least in part on the comparison, that the quality level of the second instance of the video flow is better than the quality level of the first instance of the video flow;

a switchover module, stored in memory, that performs a flow-level switchover from the first instance of the video flow on the first link to the second instance of the video flow on the second link by:

activating the second instance of the video flow on the second link;

deactivating the first instance of the video flow on the first link;

maintaining a first instance of at least one additional flow received via the first link as active despite deactivating the first instance of the video flow received via the first link; and maintaining a second instance of the additional flow received via the second link as inactive despite activating the second instance of the video flow received via the second link; and at least one physical processing device configured to execute the measurement module, the determination module, and the switchover module.

12. The system of claim 11, further comprising a keying module, stored in memory, that pairs the first instance of the video flow received via the first link with the second instance of the video flow received via the second link by:

creating a video key that applies to the first and second instances of the video flow; and appending the video key to the first and second instances of the video flow.

13. The system of claim 12, wherein the keying module:

appends, to the first instance of the video flow, a first flow key that uniquely identifies the first instance of the video flow; and appends, to the second instance of the video flow, a second flow key that uniquely identifies the second instance of the video flow.

14. The system of claim 11, wherein the quality indicator for the first and second instances of the video flow further comprises at least one of:

a delay factor component;

a media loss rate component; and a video jitter component.

15. The system of claim 11, wherein:

the measurement module:

generates an alarm value for the first instance of the video flow; and generates an alarm value for the second instance of the video flow; and the determination module determines that the alarm value for the second instance of the video flow is less critical than the alarm value for the first instance of the video flow.

16. The system of claim 13, wherein the determination module reevaluates whether the quality level of the first instance is better than the quality level of the second instance on a periodic basis.

17. An apparatus comprising:

a first interface communicatively coupled to a first link within a network;

a second interface communicatively coupled to a second link within the network; and at least one physical processing device communicatively coupled to the first and second interfaces, wherein the physical processing device is to:

measure a quality level of a first instance of a video flow received via the first link by:

identifying at least one quality indicator for the first instance of the video flow, the quality indicator for the first instance of the video flow comprising a media rate variation of the first instance of the video flow that represents a relationship between an expected packet rate of the first instance and an actual packet rate of the first instance; and calculating the expected packet rate of the first instance by:

multiplying a number of packets in the first instance carried via a network layer during a Media Delivery Index (MDI) interval by a size of the packets in the first instance; and dividing a rate at which the video flow is expected to traverse a network device during the MDI interval by a product of the multiplication of the number of packets in the first instance and the size of the packets in the first instance, wherein the first instance of the video flow is currently active and forwarded toward a destination of the video flow;

measure a quality level of a second instance of the video flow received via the second link by:
identifying at least one quality indicator for the second instance of the video flow, the quality indicator for the second instance of the video flow comprising a media rate variation of the second instance of the video flow that represents a relationship between an expected packet rate of the second instance and an actual packet rate of the second instance; and
calculating the expected packet rate of the second instance by:
multiplying a number of packets in the second instance carried via the network layer during the MDI interval by a size of the packets in the second instance; and
dividing the rate at which the video flow is expected to traverse the network device during the MDI interval by a product of the multiplication of the number of packets in the second instance and the size of the packets in the second instance, wherein the second instance of the video flow is currently inactive and not forwarded toward the destination of the video flow;

determine that the quality level of the second instance of the video flow is better than the quality level of the first instance of the video flow by:
comparing the quality indicator for the first instance of the video flow with the quality indicator for the second instance of the video flow; and
determining, based at least in part on the comparison, that the quality level of the second instance of the video flow is better than the quality level of the first instance of the video flow; and perform a flow-level switchover from the first instance of the video flow on the first link to the second instance of the video flow on the second link by:
activating the second instance of the video flow on the second link;
deactivating the first instance of the video flow on the first link;
maintaining a first instance of at least one additional flow received via the first link as active despite deactivating the first instance of the video flow received via the first link; and
maintaining a second instance of the additional flow received via the second link as inactive despite activating the second instance of the video flow received via the second link.

\* \* \* \* \*